United States Patent [19]

Lee et al.

[11] 4,358,814
[45] Nov. 9, 1982

[54] CAPACITIVE PRESSURE SENSOR

[75] Inventors: Shih-Ying Lee, Lincoln; Dennis K. Briefer, Berlin, both of Mass.

[73] Assignee: Setra Systems, Inc., Natick, Mass.

[21] Appl. No.: 200,788

[22] Filed: Oct. 27, 1980

[51] Int. Cl.³ .............................................. H01G 7/00
[52] U.S. Cl. ....................................... 361/283; 73/724
[58] Field of Search .................... 361/283; 73/718, 724

[56] References Cited
U.S. PATENT DOCUMENTS

| 4,084,438 | 4/1978 | Lee et al. | |
| 4,158,311 | 6/1979 | Yasuhara | 361/283 X |
| 4,158,517 | 9/1979 | Lee | 361/283 |
| 4,229,776 | 10/1980 | Antikainen | 361/283 |

OTHER PUBLICATIONS

Rosemont Eng. Bulletin 6626, Minneapolis, Minn., 1970, pp. 1-3.

Primary Examiner—Elliot A. Goldberg
Attorney, Agent, or Firm—Kenway & Jenney

[57] ABSTRACT

A capacitive pressure sensor including a concave base member coupled to a central base support. The base member has a flange extending from its rim having a substantially planar surface. A conductive, deformable diaphragm is stretched across the flange and held by a clamping ring having a surface complementary to the flange. A substantially planar electrode is positioned substantially parallel to and displaced by a predetermined distance from the diaphragm by an electrode support member coupled to the central base support.

35 Claims, 3 Drawing Figures

CAPACITIVE PRESSURE SENSOR

REFERENCE TO RELATED PATENT APPLICATION

This application is related to U.S. Pat. Application Ser. No. 200,790, entitled "Diaphragm", filed on even date herewith. That application is incorporated by reference herein.

BACKGROUND OF THE INVENTION

This invention relates to a pressure sensor and more particularly, a pressure sensor which relies on changes in capacitance to indicate pressure fluctuations.

Capacitive pressure sensors are well known in the prior art. Such sensors typically have a fixed element having a rigid, planar conductive surface forming one plate of a substantially parallel plate capacitor. A deformable, conductive member, such as a metal foil diaphragm, forms the other plate of the capacitor. Generally, the diaphragm is edge-supported so that a central portion is substantially parallel to and opposite the fixed plate. Since the sensor generally has the form of a parallel plate capacitor, the characteristic capacitance of the sensor inversely proportional to the gap, d, between the central portion of the diaphragm and the conductive surface of the fixed element. In order for there to permit a pressure differential across the diaphragm, the region on one side of the diaphragm is sealed from the region on the opposite side.

In practice, the diaphragm elasticity is selected so that pressure differentials across the diaphragm in a particular range of interest cause displacements of the central portion of the diaphragm. These pressure differential-induced displacements result in corresponding variations in the gap, d, between the two capacitor plates, and thus in capacitance variations in the sensor capacitor. For relatively high sensitivity, such sensors require high changes of capacitance in response to relatively small gap changes. To achieve such sensitivity from unit to unit, nominal gap dimensions and plate parallelism must be well controlled. Consequently, such sensors require that their component parts be manufactured to very close tolerances to establish the required dimensional relationships. In addition, the structure and materials must maintain those relationships over a useful temperature range.

In one form of prior art sensor, exemplified by the sensor of the Model 237 transducer manufactured by Setra Systems, Inc., the fixed metallic electrode is supported with respect to the diaphragm support member by means of an electrically non-conductive, high temperature glass portion. Because of the differences in the thermal expansion coefficients between such glass and the metal electrode and diaphragm support member, temperature changes cause changes in the gap between the fixed electrode and diaphragm (i.e. the plates of the capacitor), resulting in erroneous pressure readings. In addition, the effective seal between the regions on opposite sides of the diaphragm may only be economically maintained over a relatively small temperature range. Thus, such sensors give reliable pressure readings over only a relatively small range of temperatures.

Moreover, during the manufacture of such sensors, the fixed electrode must be set in the glass portion and then the conductive plate portion must generally be tailored (e.g. by lapping) to establish the necessary gap and parallelism. Consequently, those variable capacitance pressure sensors are relatively expensive to manufacture.

Moreover, during the manufacture of such sensors, the fixed electrode is generally set into the glass portion while the glass is in its molten state. As the assembly cools, mechanical stresses are set up which typically alter the desired initial gap dimension or degrade the parallelism between the capacitive plates. Following cooling of the assembly, the fixed electrode may need to be tailored (e.g. by lapping) to re-establish the critical gap and parallelism. In view of these processing steps, such sensors are relatively difficult and corespondingly expensive to manufacture.

It is, therefore, an object of this invention to provide a capacitive pressure sensor which overcomes the disadvantages known in the prior art. Specifically, an object of this invention is to provide such a pressure sensor which maintains relatively high sensitivity over a large temperature range.

Another object of this invention is to provide a capacitive pressure sensor which is highly reliable, inexpensive and easy to manufacture.

SUMMARY OF THE INVENTION

Briefly, the capacitive pressure sensor of the present invention includes a cup-like, or concave, metal base member coupled to a base support at the center of the bottom of the base member. The base member includes a flange portion extending from its rim, where the flange is generally planar except for a circumferential depression. A relatively thin, deformable conductive diaphragm is disposed across the flange of the base member. A clamping ring having a surface which complements the flange of the base member is affixed to the edge of the diaphragm and the flange so that the diaphragm is clamped under tension to the flange.

An electrode assembly is affixed to the base support within the closed volume formed by the base member and diaphragm assembly. The electrode assembly includes a conductive electrode having a planar portion and a dielectric support member. The support member is connected to the base support so that the planar portion of the electrode is substantially parallel to and displaced by a predetermined distance d, from the flange of the base member. With this configuration, the diaphragm and the planar portion of the electrode form a parallel plate capacitor. Moreover, in response to pressure differentials, the diaphragm is displaced, resulting in corresponding changes in capacitance. Electrical connection to the capacitor may be provided by direct connection to the base member for one plate and a feed-through connection to the plate formed by the planar portion of the electrode.

In one form of the invention, the base support extends through the base member to a region outside the enclosed volume formed by the base member and diaphragm assembly. In this form, a first pressure port may be provided through the base support to the interior of the enclosed volume to permit control of the pressure on the interior surface of the diaphragm. In addition, a housing may be provided over the entire base member and diaphragm assembly, where the housing includes a second pressure port to permit control of the pressure on the exterior surface of the diaphragm. With the configuration of the present invention, there are a minimum of high tolerance parts and complex assembly operations with the only critical dimensional assembly operation being the initial alignment of the electrode with respect to the flange of the base member. Since this step only involves solid materials at room temperature, there are minimal mechanical stresses established. Moreover, since there are no glass-to-metal seals, there are no problems due to mis-match of temperature coefficients. Consequently, the present invention provides a high sensitivity broad temperature range capacitance pressure sensor.

In a preferred method of construction, the dielectric support member and electrode are first coupled to the base member and base support with the planar portion of the electrode being parallel to and a predetermined distance d from the flange of the base member. Then the diaphragm is placed across and in contact with the flange of the base member so that it overlies the depression in the flange. The clamping ring is then forced into mating relation with the flange, effectively sandwiching the diaphragm. The clamping ring is then affixed to the flange, for example, by a series of spot welds. In some forms of the invention, a sealing material is also included between the diaphragm and flange. As a result, the diaphragm is edge supported across the base member and maintained under radial tension.

An alternate form of the invention includes the principal elements of the above described form and also includes a concave upper member, having a peripheral flange which is complementary to the flange of the base member. The flanges may include a circumferential depression in some forms, and may be substantially planar in others.

BRIEF DESCRIPTION OF THE DRAWING

The invention disclosed herein will be better understood with reference to the drawings, in which.

DESCRIPTION OF THE PREFERRED EMBODIMENT

Figure 1:
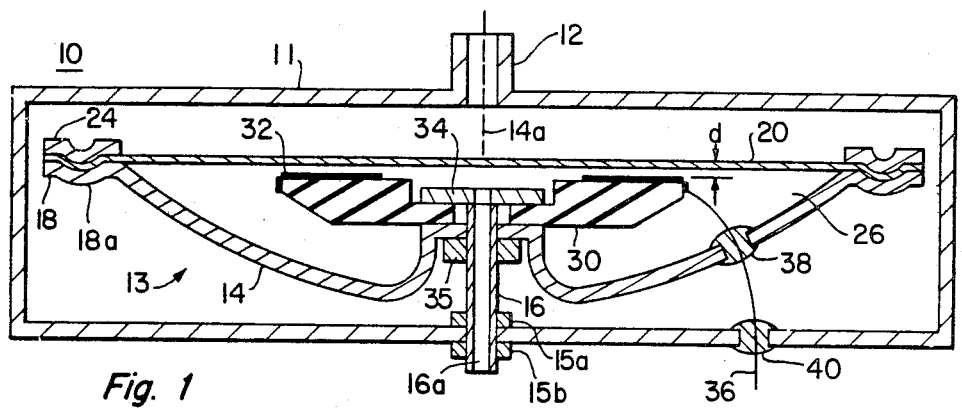
FIG. 1 shows a cross-sectional view of an embodiment of a capacitive pressure sensor of the present invention.

In FIG. 1, the capacitive pressure sensor 10 includes an enclosing pressure vessel or housing 11, preferably made of stainless steel. The housing 11 includes a pressure port 12 which communicates with the interior of the housing 11. A variable capacitor (indicated generally by reference numeral 13) is coupled to and disposed within housing 11. This capacitor 13 includes a cup-like base member 14. The base member 14 is connected to a base support 16 at the center and bottom of the base member 14. Base support 16 extends along a central axis 14a of base member 14. The capacitor 13 is positioned generally within housing 11 by nuts 15a and 15b on an externally threaded portion of base support 16. Base member 14 includes a flange portion 18 which extends from its rim. The flange portion 18 is generally planar except for a circumferential depression 18a. In other forms of the invention, the depression 18a may be "negative", that is it may be a ridge, or extend upward from the nominally planar portion of flange 18. In a preferred form, the member 14 is made of pressed stainless steel, including a portion having the form of a spherical section. This form provides a low cost, rigid base member. In alternate embodiments, member 14 may, for example, have the form of a right circular cylindrical cup, produced for example by machining.

A relatively thin, deformable conductive diaphragm 20 stretches across the base member 14 so that its edges overlie the flange 18.

In one form, the diaphragm 20 may be made of stainless steel, having a thickness in the range of 0.002 to 0.030 inches. Alternatively, the diaphragm 20 have the form disclosed in the incorporated reference. The diaphragm may be a metal foil, or a non-conductive material having a conductive portion, for example, established by a deposited conductive film.

The sensor further includes a clamping ring 24, having a lower (as shown) surface which complements the upper (as shown) surface of flange 18 including its depression 18a. Clamping ring 24 is affixed to the edge of the diaphragm 20 and the flange 18, thereby establishing a closed volume 26 within the assembly formed by base member 14 and diaphragm 20. In some embodiments, a conventional sealing compound may be used between the diaphragm 20 and flange 18.

A protective "housing" for diaphragm 20 may alternatively be formed by upper member which may be a metal plate having a radius matching the outer radius of flange 18, where that plate is supported by an annulus of an elastomer material (such as RTV manufactured by Dow Corning) mounted on the top of ring 24.

The sensor 10 further includes within the volume 26 an electrode support member 30 connected to base support 16, and an associated electrode 32 having a planar surface. The support member 30 is a dielectric material, such as a ceramic material, having a planar annular upper surface. The electrode 32 is a thin metallic film on that upper surface. The film may for example be thermally deposited or evaporated onto the dielectric support member 30. In the illustrated embodiment, the support member 30 includes a central depressed (or counter sunk) region for accommodating the stop member 34 of support 16 and the conductive film has the form of an annular ring to minimize non-linearities due to the generally spherical shape of the central region of the diaphragm 10 during operation.

In the present embodiment, the base support 16 is externally threaded and has an upper stop member 34. With this configuration, a nominal gap, d, between electrode 32 and diaphragm 20 (along axis 14a) may be set using a nut 35 and spacers (if necessary) between base member 14 and electrode support 30.

In accordance with the invention, the electrode support member 30 and diaphragm support (base member 14) are center mounted to base support 16, minimizing the effect of differential thermal expansion on the dimensions of gap d. It is preferred that the contact area between 14, 16 and 30 is small to further minimize the effect of thermal expansion on the gap, and minimize thermal stress.

A lead 36 provides external electrical contact to the electrode 32 by way of insulating feed-through connections 38 and 40. In the present embodiment, external electrical contact to diaphragm 20 is provided by the base support 16 (by way of base member 14). These two electrical contact points may be utilized with conventional capacitance measuring circuitry to provide a signal representative of the capacitance associated with the electrode 32 and diaphragm 20.

In alternate embodiments, the electrical coupling to the diaphragm 20 and electrode 32 may differ. For example, the electrode 32 and support member 30 and base support 16 may be an integral metallic structure, with base member 14 being insulated from support 16. In that embodiment, electrical contact may be made to support 16 and base member 14. In the present configuration, base support 16 includes a central channel 16a providing a pressure port to the volume 26.

In the present embodiment, the diaphragm 20 is edge-supported under radial tension. This invention allows the fastening the tensioning of diaphragm 20 to be accomplished in a single step. In the preferred method of manufacture, the base member 14, and electrode support member 30 are first assembled so that the planar portion of electrode 32 is parallel to and a predetermined distance d from the planar flange 18. Lead 36 is then installed. Then, the diaphragm 20 is stretched across the flange 18 and the clamping ring 24 is pressed into mating relationship with the flange 18 (and depression 18a). The clamping ring is then secured to spot welding or another suitable technique. In the process of mating the ring 24 with the depression 18a, the diaphragm 20 is deformed in such a way that the diaphragm 20 is placed under radial tension. In alternate forms of the invention, particularly those having substantially flat diaphragms, the flange 18 and clamping ring 24 may have substantially planar opposing surfaces (i.e. without the circumferential depression). In yet other embodiments of the invention, the complementary surfaces of flange 18 and ring 24 may have forms, such as a conical shape.

In an alternate method of assembly, where flange 18 is planar, the diaphragm may be connected to the flange 18 under radial tension by the following steps. First, the base member 14 is set in a jig which supports flange 18 from the bottom and pulls the support 16 downward to slightly deform member 16. Then the diaphragm 20 is positioned across flange 18 and clamping ring 24 is positioned over diaphragm 20 and flange 18. Ring 24 is then welded to flange 18, securing diaphragm 20. Then, as support 16 is released, member 16 returns to its original shape, in doing so, placing diaphragm 20 under radial tension.

In some forms of the invention (for example, those in which diaphragm 20 is a flat metallic foil having a wrinkle pattern such as that shown in FIGS. 9 and 10 of the incorporated reference), the diaphragm 20 need not be affixed across flange 18 under radial tension, but rather may just be positioned across and affixed to the flange 18.

Figure 2:
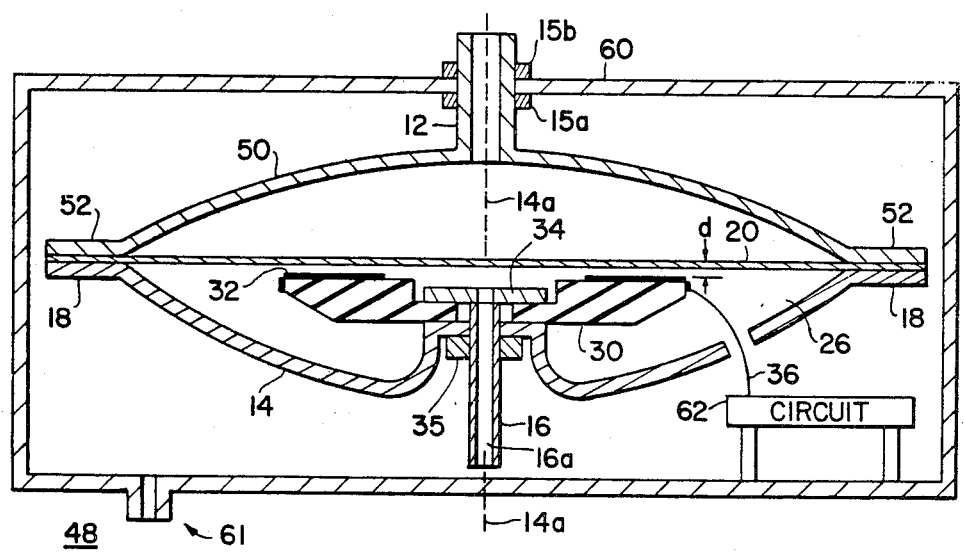
FIGS. 2 and 3 show cross-sectional views of other embodiments of a capacitive pressure sensors of the present invention.

FIG. 2 shows another sensor 48 of the present invention which is similar to the embodiment of FIG. 1. Elements in the configuration of FIG. 2 having corresponding elements in the configuration of FIG. 1 are identified with the same reference numerals. The embodiment of FIG. 2 includes a concave upper member 50. Upper member 50 has a circumferential annular flange 52 with a lower surface complementary to the upper surface of flange 18 of base member 14. As shown, the opposing surfaces of flanges 18 and 52 are planar, but in other forms, those flanges may have complementary circumferential depressions, or ridges. In FIG. 2, the nuts 15a and 15b secure the sensor 48 (by way of pressure port 12) to an external support member 60. Member 60 also serves as a housing for sensor 48, and includes an input port 61 for coupling an input pressure (by way of channel 16a) to the region between diaphragm 20 and base member 14. In this form, the lead 36 may be coupled to a measuring circuit 62 which is mounted within member 60. There is no need for feed-through coupling corresponding to couplings 38 and 40 in FIG. 1. The upper member 50 provides an integral front end cavity. In addition, upper member 50 provides negative overpressure protection, physical protection for the diaphragm, and provides a member for mounting the device which isolates the sensitive gap-forming elements of the sensor. The electrode support member 30 and electrode 32 provide positive overpressure protection.

To operate the sensors 10 and 48 as differential sensors, port 12 is connected to a first source of pressure and the central channel 16a within base support 16 is connected to the other source of pressure. Any pressure differential will cause the diaphragm 20 to deflect either toward or away from the electrode 32. Such a change in the distance between the diaphragm 20 and the electrode 32 causes a change in capacitance between these two elements. This capacitance may then be measured between lead 36 and the base support member 16 by conventional capacitance measuring apparatus (not shown). The sensors 10 and 48 may be also used as absolute pressure sensors by sealing off either port 12 or the channel 17 of base support member 16, while coupling the unsealed port to the region whose pressure is to be measured. As before, the pressure is sensed by noting the change in capacitance associated with the gap between diaphragm 20 and electrode 32. Because of the central mounting arrangement, wherein both the electrode 32 and its support member 30, as well as the base member 14, are supported at their centers by the base support member 16 (with a relatively small area of contact between the metal base member 14 and ceramic electrode support member 30), deformations resulting from mounting stresses are eliminated thereby removing mounting stresses, as well as stresses caused by differential thermal expansion, as sources of error.

Figure 3:
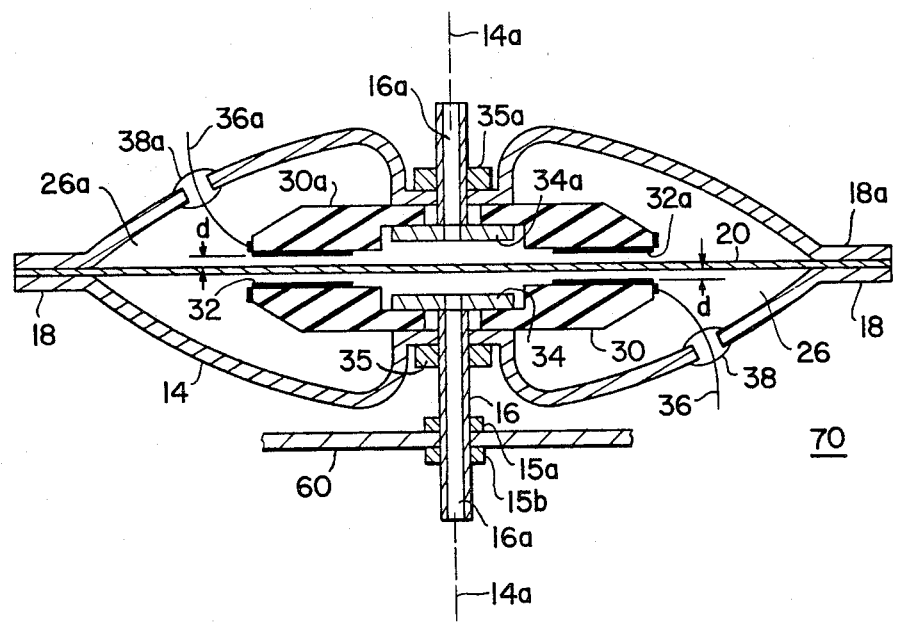

FIG. 3 shows another sensor 70 in accordance with the present invention. Sensor 70 is similar to the sensor 48 of FIG. 2, except that in sensor 70 the upper member 50 of sensor 48 is replaced with an upper member assembly which is substantially similar to the base assembly of sensor 48. In FIG. 3, elements having corresponding elements in the embodiment of FIG. 2 are identified with identical reference numerals. Elements of the top assembly of sensor 70 which correspond to elements in the bottom assembly of sensor 48 are denoted by the same reference numerals followed by a lower case "a". The sensor 70 thus includes a conductive central diaphragm 20 which is between and separated (by gaps d and d', respectively) from two planar conductive (adjustably positioned) surfaces 32 and 32a. The electrical leads 36 and 36a and a lead coupled to the periphery of diaphragm 20 may be utilized with capacitance sensing instrumentation, such as that disclosed in U.S. Pat. No. 4,054,833.

It is thus seen that the objects of this invention have been met and that there has been disclosed a capacitive pressure sensor which is simple to manufacture and reliable in operation. Furthermore, the sensor disclosed herein is less susceptible to errors induced by thermal variations and mechanical mounting stresses.

It is to be understood that variations and modifications of the invention disclosed herein will occur to those skilled in the art. It is intended that all such modifications and variations fall within the scope of the appended claims.

What is claimed is:

1. A capacitive pressure sensor comprising:

A. a diaphragm having an electrically conductive central portion,
B. a rigid concave base member extending about a first central axis, and having rim lying in a first plane, said first plane being perpendicular to said central axis, said base member including a flange extending from its rim,
C. means for securing the periphery of said diaphragm to said flange whereby said diaphragm periphery lies substantially in said plane,
D. base support member extending along said central axis through and coupled to the center of said base member substantially at said center axis,
E. first electrode fixedly coupled to said base support member and including a substantially planar conductive surface substantially parallel to and separated by a gap, d, from said diaphragm.

2. A sensor according to claim 1 wherein said central portion of said diaphragm is under radial tension and said base member flange includes a circumferential depression, and wherein said securing means includes:
a clamping ring means said clamping rings means having a surface complementary to said flange, and means for connecting said complementary surfaces of said flange and said clamping ring to opposite sides of said diaphragm periphery.

3. A sensor according to claim 1 further including a concave upper member extending about a second central axis and having a rim lying in a second plane, said second plane being perpendicular to said second central axis, said upper member including a flange extending from its rim, wherein said upper member flange and said base member flange have complementary surfaces, and wherein said securing means includes means for connecting said complementary surfaces of said flanges to opposite sides of said diaphragm periphery to enclose said diaphragm and wherein said first and second central axes are coaxial.

4. A sensor according to claim 1 wherein said base support member extends along the central axis of said base member within the volume between said base member and said diaphragm, and
further including means to adjustably position said planar surface of said first electrode along said first central axis.

5. A sensor according to claim 4 wherein said base support member is electrically non-conductive.

6. A sensor according to claim 3 further comprising:
an upper electrode support member extending along said second central axis from the center of said upper member, and
a second electrode coupled to said upper electrode support member and including a substantially planar conductive surface substantially parallel to and separated by a gap, d', from said diaphragm.

7. A sensor according to claim 6 further including means to adjustably position said planar surface of said second electrode along said second central axis.

8. A sensor according to claim 6 wherein said upper electrode support member is electrically non-conductive.

9. A sensor according to claim 1 further comprising a housing member coupled to said base support member and enclosing said base member and diaphragm.

10. A sensor according to claim 1 or 3 or 9 further comprising means for coupling the region enclosed by said diaphragm and said base member to an external pressure.

11. A sensor according to claim 9 wherein said housing includes means for coupling the region internal to said housing and external to the region enclosed by said diaphragm and said base member to an external pressure.

12. A sensor according to claim 3 further comprising means for coupling the region between said diaphragm and said upper member to an external pressure.

13. A sensor according to claims 1 or 3 or 9 further comprising means for maintaining the region between said diaphragm and said base member at a predetermined pressure.

14. A sensor according to claim 3 further comprising means for maintaining the region between said diaphragm and said upper member at a predetermined pressure.

15. A sensor according to claim 9 further comprising means for maintaining the region between said diaphragm and said housing member at a predetermined pressure.

16. A sensor according to claim 1 or 3 or 9 wherein said base member flange is planar.

17. A sensor according to claim 1 or 3 or 9 wherein said base member flange is conical.

18. A sensor according to claim 1 or 3 or 9 wherein said base member flange includes a circumferential depression.

19. A sensor according to claim 1 or 3, wherein said base member includes a spherical section.

20. A sensor according to claim 19 wherein said base member is pressed stainless steel.

21. A sensor according to claim 1 or 3 wherein said first electrode includes a dielectric support member and a relatively thin conductive film positioned on a substantially planar surface thereof to provide said planar conductive surface.

22. A sensor according to claim 3 wherein said upper member includes a spherical section.

23. A sensor according to claim 22 wherein said upper member is pressed stainless steel.

24. A capacitive pressure sensor comprising:
diaphragm responsive to pressure and including a central electrically conductive portion,
means for supporting said diaphragm, said supporting means being rigid and generally concave and including means adapted at its periphery for holding said diaphragm to create an enclosed volume,
an elelectrode member having a substantially planar conductive portion and an insulating means for support, said electrode member disposed within said volume and fixedly positioned with respect to said supporting means,
means for coupling said electrode support means to said concave member substantially at the center of said concave supporting member, whereby said conductive portion of said electrode member is substantially parallel to and spaced from said conductive portion of said diaphragm in capacitive relationship so that the capacitance associated with said conductive portions of said electrode and said diaphragm is substantially inversely proportional to the pressure differential across said diaphragm.

25. A sensor according to claim 24 wherein said concave supporting member includes a spherical section.

26. A sensor according to claim 25 wherein said concave supporting member is pressed stainless steel.

27. The pressure sensor of claim 24 including means for holding said diaphragm under radial tension comprising a flange at the rim of said supporting means, said flange being substantially planar, an annular clamping ring means said clamping ring means having a surface configured to mate with said flange, whereby said diaphragm is radially stressed when said clamping ring is pressed into mating relation with said flange with said diaphragm disposed therebetween, and means for securing said ring and flange to opposite surfaces of the periphery of said diaphragm.

28. The pressure sensor of claim 27 wherein said flange is planar.

29. The pressure sensor of claim 27 wherein said flange is conical.

30. The pressure sensor of claim 27 wherein said flange includes a circumferential depression.

31. The pressure sensor of claim 27 wherein said annular clamping ring includes a concave upper member connected to one edge of said annular clamping ring.

32. A sensor according to claim 31 wherein said concave upper member includes a spherical section.

33. A sensor according to claim 32 wherein said concave upper member is pressed stainless steel.

34. A sensor according to claim 27 wherein said concave supporting member includes a spherical section.

35. A sensor according to claim 34 wherein said concave supporting member is pressed stainless steel.

* * * * *

UNITED STATES PATENT AND TRADEMARK OFFICE
CERTIFICATE OF CORRECTION

PATENT NO. : 4,358,814
DATED : November 9, 1982
INVENTOR(S) : Shih-Ying Lee and Dennis K. Briefer It is certified that error appears in the above-identified patent and that said Letters Patent are hereby corrected as shown below:

Column 4, line 7, "0.002" should be --0.0002--;

Column 5, line 18, "to" should be --by--.

Signed and Sealed this

Second Day of April 1985

[SEAL]

Attest:

DONALD J. QUIGG

*Attesting Officer*   *Acting Commissioner of Patents and Trademarks*